INVENTOR
JAMES G. HEASLET
BY George Douglas Jones
ATTORNEY

Oct. 8, 1940.   J. G. HEASLET   2,217,251
FUEL TANK AND BONNET SUPPORT
Filed Jan. 8, 1940   2 Sheets-Sheet 2

INVENTOR
JAMES G. HEASLET
BY George Douglas Jones
ATTORNEY

Patented Oct. 8, 1940

2,217,251

UNITED STATES PATENT OFFICE 2,217,251

FUEL TANK AND BONNET SUPPORT

James G. Heaslet, Hudson, Ohio, assignor to The Cleveland Tractor Company, Cleveland, Ohio Application January 8, 1940, Serial No. 313,005

4 Claims. (Cl. 180—1)

This invention relates to tractors and, more particularly to a novel fuel tank and motor bonnet therefor.

Heretofore tractors have been unsightly in appearance due to the crudeness of the bonnets or hoods and fuel tanks employed. Tractor designers have endeavored to improve the appearance of vehicles of this type, while being confronted with the problem of properly supporting the fuel tanks and bonnets and maintaining the necessary engineering characteristics of the tractor.

The present invention contemplates a symmetrical bonnet or hood structure which overlies and protects the power plant of the tractor and is supported at its forward end by an ornamental grille and at its rear end by the fuel tank.

This construction not only renders the tractor attractive in appearance, but also properly supports the fuel tank in a most desirable location while permitting streamlining or flowing lines to be created in the hood portion which terminates at the rear thereof in the curved configuration of the fuel tank.

A further object is the rigid support for the fuel tank, together with a vibration proof mounting therefor, which insures its constant position, while lessening its exposure to stresses and strains which might spring the seams of the tank. The supporting means for the tank is, furthermore, combined with means for enclosing the forward portion of the tank by the rear portion of the bonnet and to tie these two structures into an attractive and unitary structure.

Figure 1:
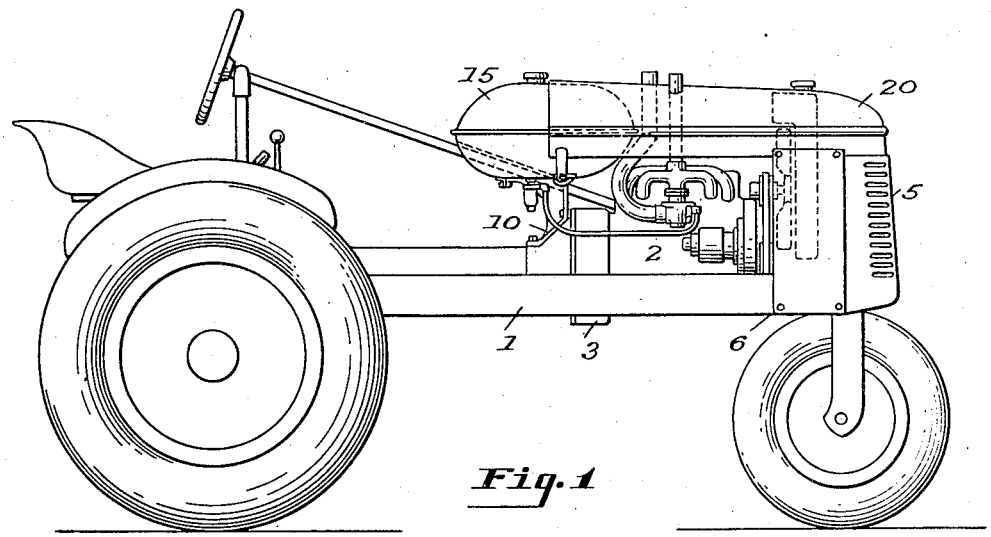
Fig. 1 is a side elevation of a wheel type tractor embodying the present invention.
Figure 2:
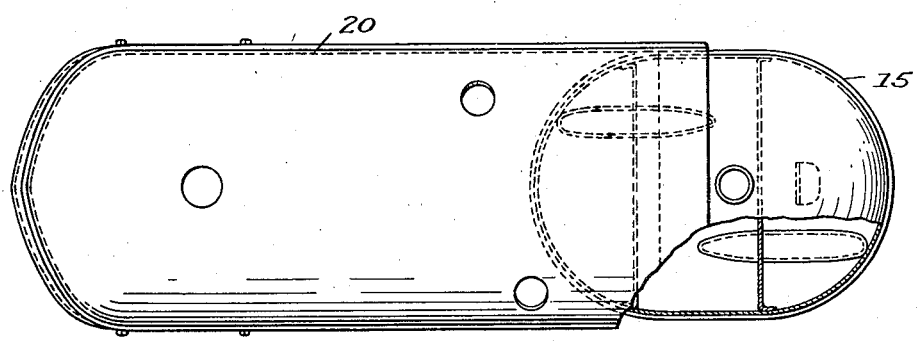
Fig. 2 is a top plan view of the bonnet and tank with the latter shown partly in dotted lines and also in broken away condition.

The invention is applicable to all wheel type tractors in general, although the specific invention resides in the supporting means for the bonnet or hood overlying the power plant in combination with the fuel tank support and rear bonnet tying means.

The drawings show a conventional wheel type tractor having a chassis frame 1 supporting a power plant 2 and including a clutch housing 3 and propeller shaft housing 4 between the sides of the frame. A front grille or radiator cover 5 is secured between the front ends of the side frames and preferably, although not necessarily, opposite side plates 6 are bolted to the side frames directly to the rear of the grille 4.

Figure 3:
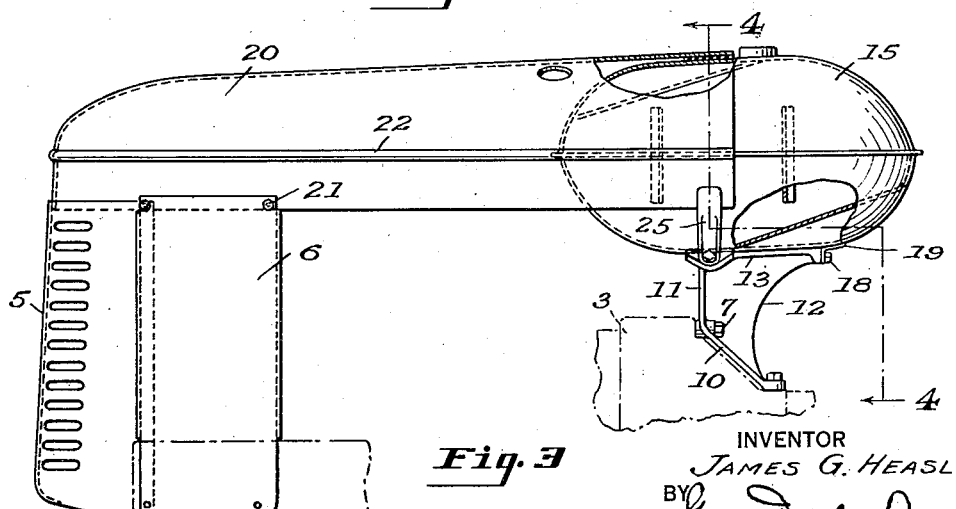
Fig. 3 is a side elevation of the bonnet, front grille and tank with its supporting means with a portion of the tank and bonnet broken away to show the arrangement of the parts.

Bolted or otherwise secured by machine screws 7 to the clutch housing 3, usually of bell formation, is an upstanding bracket or support 10 of generally T-shape in horizontal cross section. The brace or support 10 rests on the flared surface of the clutch housing and is also secured to this outer bell portion to insure its rigidity. The support 10 comprises a vertical plate 11 having a rearwardly extending central flange 12, the outer edge of which is arcuate, as shown in Fig. 3 of the drawings.

Figure 4:
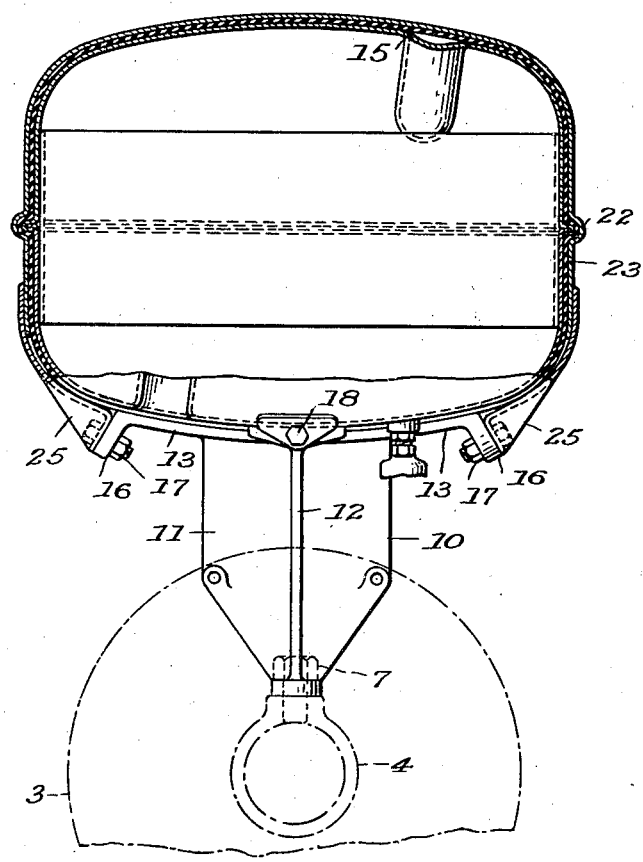
Fig. 4 is a vertical cross section taken on line 4—4 of Fig. 3, illustrating the tank supporting means and tie means for the rear portion of the bonnet.

An integrally curved and laterally extending platform or base 13 is formed on the top of the brace 10 for the purpose of supporting a fuel tank 15, and it will be observed from Fig. 4 that the laterally extending arms 13 are slightly arcuate to insure a full and uniform fit across the bottom of the tank. The outer ends of the laterally extending arms 13 are turned out at an angle and provided with openings 16 for the reception tie bolts 17, which will be hereinafter described.

A rearward extension 14 of the brace 10 is integrally formed on the web or flange 12 and is tapped for the reception of a machine screw 18, which passes through an opening formed in lug 19 welded to the lower portion of the tank 15. Thus, the tank is supported throughout a substantial portion of its bottom surface and is prevented from longitudinal movement by machine screw 18 and lug 19.

The bonnet or hood covering the power plant 2 extends from the forward grille 5 rearwardly over slightly more than one-half of the body of the tank 15. As shown, the bonnet is preferably pressed from a single blank of metal and is supported by the grille 5 and bolts 21 positioned in the upper edge of the side plates 6. The lower edge portion of the bonnet is beaded or pressed outwardly as at 22 to give an ornamental appearance to the body, but, more particularly, to support and bind the longitudinal side seams of the tank 15, it being customary to form fuel tanks of this character of two pressed metal sections joined at their longitudinal mid-section by a simple lap joint.

Figure 5:
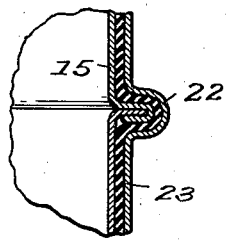
Fig. 5 is an enlarged fragmental cross sectional view taken on line 4—4 of Fig. 3, illustrating the sealing means between the outer periphery of the tank, its seam and the side walls of the bonnet.
Figure 6:
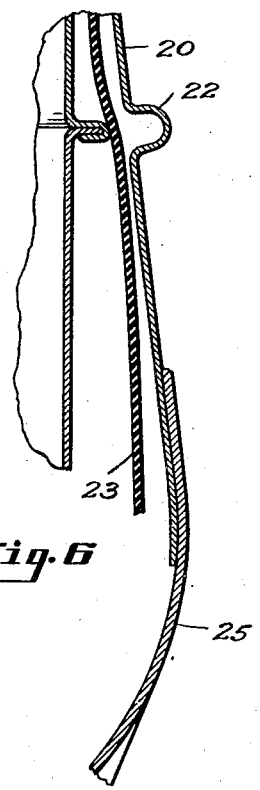
Fig. 6 is a similar view to Fig. 5 in which the tank sealing strip and bonnet side are opened up to further show its construction.

A tight seal and vibration dampening member 23 is positioned between the side seams of the tank and the side bead or grooves 22 of the bonnet, and comprises a rubber or other resilient strip 23 placed around the periphery of the tank at the rear portion of the bonnet where it overlaps the tank. This strip or seal 23 completely engages the side seam of the tank and is held in fixed position thereabout by the side walls of the bonnet and the beads 22. See Figs. 4 and 5 of the drawings.

Straps or ties 25 are welded to the lower edges of the rearward portions of the side walls of the bonnet and extend downwardly into engagement with the outturned ears 16 of the lateral arms 13. These straps or ties terminate in outturned flat sections 26 which are provided with openings for the reception of bolts 17 and, thus, they may be drawn tightly against the ears 16 of the tank supporting brace.

It will be observed from the drawings that the bonnet is formed of a single sheet of metal and provided with the necessary openings therein for the radiator filler cap, engine exhaust and carburetor intake pipes.

This structure not only renders the tractor attractive and streamlined in appearance, but results in a mechanically sound and balanced design.

What I claim is:

1. In a tractor, a chassis frame, a power plant thereon, a fuel tank therefor, an upstanding bracket secured to the bell housing of said power plant for supporting said tank, said bracket having laterally extending arms embracing the bottom of the fuel tank, a bonnet overlying the said power plant, said bonnet being supported at its forward end by plates affixed to the chassis frame and at its rear end by said tank, the lower edges of the rear portion of the said bonnet being provided with straps for engagement with the ends of the said laterally extending arms and longitudinal beads pressed outwardly from the side walls of said bonnet adapted to bind and overlie the side seams of said fuel tank.

2. In a tractor, a chassis frame, a power plant thereon, a fuel tank therefor, an upstanding bracket secured to the bell housing of said power plant for supporting said tank, said bracket having laterally extending arcuate arms embracing the bottom of the fuel tank, a bonnet overlying the said power plant, said bonnet being supported at its forward end by plates affixed to the chassis frame and at its rear end by said tank, the lower edges of the rear portion of the said bonnet being provided with straps for engagement with the ends of the said laterally extending arcuate arms, and a flexible non-metallic strip overlying said tank and tank seams at the area of contact of said bonnet with said tank.

3. In a tractor, a chassis frame, an internal-combustion engine having a bell shaped clutch housing mounted on said frame, a fuel tank for said engine, said tank being solely supported by a bracket secured to said bell shaped clutch housing, the said bracket having a base conforming to the slope of the housing and rising above the said housing, an integral web outwardly extending at right angles to said base, laterally extending arcuate arms integrally formed at the top of said base for supporting the said fuel tank, and an integral arcuate platform formed on the top of said web for further supporting said tank.

4. In a tractor, a chassis frame, an internal-combustion engine having a bell shaped clutch housing mounted on said frame, a fuel tank for said engine, said tank being solely supported by a bracket secured to said bell shaped clutch housing, the said bracket having a base conforming to the slope of the housing and rising above the said housing, an integral web outwardly extending at right angles to said base, laterally extending arcuate arms integrally formed at the top of said base for supporting the said fuel tank, and an integral arcuate platform formed on the top of said web for further supporting said tank, a threaded opening in the outer end of said web adapted to receive a bolt passing through an eye secured to the bottom of the tank.

JAMES G. HEASLET.